United States Patent
Kim et al.

(10) Patent No.: US 8,135,259 B2
(45) Date of Patent: *Mar. 13, 2012

(54) RECORDING MEDIUM HAVING A DATA STRUCTURE FOR MANAGING REPRODUCTION OF TEXT SUBTITLE DATA AND METHODS AND APPARATUSES OF RECORDING AND REPRODUCING

(75) Inventors: Hyung Sun Kim, Seoul (KR); Byung Jin Kim, Kyunggi-do (KR); Kang Soo Seo, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 18 days.

This patent is subject to a terminal disclaimer.

(21) Appl. No.: 12/840,006

(22) Filed: Jul. 20, 2010

(65) Prior Publication Data

US 2011/0013886 A1    Jan. 20, 2011

Related U.S. Application Data

(63) Continuation of application No. 10/820,009, filed on Apr. 8, 2004, now Pat. No. 7,787,753.

(30) Foreign Application Priority Data

Apr. 9, 2003    (KR) ........................ 10-2003-0022390

(51) Int. Cl.
*H04N 9/80* (2006.01)
(52) U.S. Cl. ..................................... 386/248
(58) Field of Classification Search .................. None
See application file for complete search history.

(56) References Cited

U.S. PATENT DOCUMENTS

| | | |
|---|---|---|
| 5,294,982 A | 3/1994 | Salomon et al. |
| 5,627,594 A | 5/1997 | Van Gestel |
| 5,748,256 A | 5/1998 | Tsukagoshi |
| 5,848,217 A | 12/1998 | Tsukagoshi et al. |
| 5,889,564 A | 3/1999 | Tsukagoshi |
| 5,926,647 A | 7/1999 | Adams et al. |
| 5,949,752 A | 9/1999 | Glynn et al. |
| 5,999,225 A | 12/1999 | Yagasaki et al. |

(Continued)

FOREIGN PATENT DOCUMENTS

CN    1130786 A    9/1996

(Continued)

OTHER PUBLICATIONS

W3C Recommendation, "HTML 4.01 Specification, Section 9 Text," Retrieved from the Internet: URL:http://www.w3.org/TR/1999/REC-html401-19991224/struct/text.html (last accessed on Mar. 4, 2011), Dec. 24, 1999, pp. 1-13.

(Continued)

*Primary Examiner* — William C Vaughn, Jr.
*Assistant Examiner* — Tat Chio
(74) *Attorney, Agent, or Firm* — Birch, Stewart, Kolasch & Bird, LLP

(57) ABSTRACT

In the a data structure, a subtitle area of the recording medium stores a text subtitle stream including text subtitle data and at least one of global style information and local style information. The global style information provides at least one of composition information and rendering information, and the local style information provides font information for at least a portion of the text subtitle data.

22 Claims, 7 Drawing Sheets

U.S. PATENT DOCUMENTS

| | | | |
|---|---|---|---|
| 6,046,778 A * | 4/2000 | Nonomura et al. | 348/565 |
| 6,167,410 A | 12/2000 | Imamura | |
| 6,204,883 B1 | 3/2001 | Tsukagoshi | |
| 6,259,858 B1 | 7/2001 | Ando et al. | |
| 6,262,775 B1 | 7/2001 | Kim | |
| 6,288,990 B1 | 9/2001 | Fujiie et al. | |
| 6,345,147 B1 | 2/2002 | Mimura et al. | |
| 6,445,649 B1 | 9/2002 | Saito et al. | |
| 6,553,180 B1 | 4/2003 | Kikuchi et al. | |
| 7,106,381 B2 | 9/2006 | Milaro et al. | |
| 7,236,687 B2 | 6/2007 | Kato et al. | |
| 7,561,780 B2 | 7/2009 | Seo et al. | |
| 7,593,060 B2 | 9/2009 | Yoo et al. | |
| 2001/0030710 A1 * | 10/2001 | Werner | 348/467 |
| 2002/0087999 A1 | 7/2002 | Kashima | |
| 2002/0135607 A1 | 9/2002 | Kato et al. | |
| 2002/0194618 A1 | 12/2002 | Okada et al. | |
| 2003/0012558 A1 | 1/2003 | Kim et al. | |
| 2003/0039472 A1 | 2/2003 | Kim | |
| 2003/0099464 A1 | 5/2003 | Oh et al. | |
| 2003/0188312 A1 | 10/2003 | Bae et al. | |
| 2003/0202431 A1 | 10/2003 | Kim et al. | |
| 2003/0235404 A1 | 12/2003 | Seo et al. | |
| 2004/0001699 A1 | 1/2004 | Seo et al. | |
| 2004/0081434 A1 | 4/2004 | Jung et al. | |
| 2004/0202454 A1 | 10/2004 | Kim et al. | |
| 2005/0058435 A1 | 3/2005 | Chung et al. | |
| 2005/0191035 A1 | 9/2005 | Jung et al. | |
| 2005/0196147 A1 | 9/2005 | Seo et al. | |
| 2005/0198053 A1 | 9/2005 | Seo et al. | |
| 2006/0013563 A1 | 1/2006 | Adolph et al. | |

FOREIGN PATENT DOCUMENTS

| | | |
|---|---|---|
| CN | 1139273 | 1/1997 |
| CN | 1140311 A | 1/1997 |
| CN | 1214499 A | 4/1999 |
| CN | 1264894 A | 8/2000 |
| CN | 1348588 A | 5/2002 |
| EP | 0 690 335 | 1/1995 |
| EP | 0 700 211 | 3/1996 |
| EP | 1 420 580 | 5/1996 |
| EP | 0 734 181 | 9/1996 |
| EP | 0 969 444 | 1/2000 |
| EP | 1 173 031 | 1/2002 |
| EP | 1 178 691 | 2/2002 |
| EP | 1 326 451 | 7/2003 |
| EP | 1 400 968 | 3/2004 |
| JP | 8-241068 A | 9/1996 |
| JP | 9-102940 A | 4/1997 |
| JP | 9-115270 A | 5/1997 |
| JP | 0-191222 A | 7/1998 |
| JP | 11-232849 | 8/1999 |
| JP | 11-252459 A | 9/1999 |
| JP | 11-252518 A | 9/1999 |
| JP | 2002-027386 | 1/2002 |
| JP | 2002-118821 A | 4/2002 |
| JP | 2002-199354 | 7/2002 |
| JP | 2002-374494 | 12/2002 |
| JP | 2003-108866 A | 4/2003 |
| JP | 3402533 B2 | 5/2003 |
| JP | 2003-173621 | 6/2003 |
| JP | 2004-194131 | 7/2004 |
| JP | 2004-533736 | 11/2004 |
| JP | 2007-523437 T | 8/2007 |
| JP | 2007-525904 T | 9/2007 |
| JP | 2007-309215 A | 11/2007 |
| KR | 1999-0048985 | 11/1999 |
| KR | 10-2003-0061953 | 7/2003 |
| KR | 03-84611 | 8/2003 |
| KR | 2004/0034403 | 4/2004 |
| RU | 2129758 | 4/1999 |
| RU | 2233011 | 7/2004 |
| RU | 2006 120 480 | 12/2007 |
| TW | I238391 | 8/2005 |
| WO | WO 01/48756 | 7/2001 |
| WO | WO 02/063878 | 8/2002 |
| WO | WO 03/056560 A1 | 7/2003 |
| WO | WO 2004/036574 | 4/2004 |
| WO | WO 2004/090885 | 10/2004 |
| WO | WO 2005/031740 | 4/2005 |
| WO | WO 2005/045835 | 5/2005 |
| WO | WO 2005/065055 | 7/2005 |
| WO | WO 2005/074400 | 8/2005 |
| WO | WO 2005/076276 | 8/2005 |
| WO | WO 2005/076609 | 8/2005 |
| WO | WO 2005/079171 A2 | 9/2005 |
| WO | WO 2005/083708 | 9/2005 |

OTHER PUBLICATIONS

"Digital Video Broadcasting (DVB)" ETSI Standards, European Telecommunications Standards Institute, Sophia-Antipo, FR, vol. BC, No, V121, Jun. 2002, XP014001876 ISSN:0000-0001.

Understanding SAMI 1.0 2007 Microsoft Corporation, Oct. 2001.

Microsoft Corporation: "Understanding SAMI 1.0" Microsoft Developers Network, Oct. 1, 2001, XP007902747.

* cited by examiner

FIG. 1

```
┌─── Subtitle PES Packet Structure ───┐

PTS
Number_of_Text_objects
Number_of_BMP_objects
Text_presence_flag
BMP_presence_flag
Page_composition_segment ()
Global pallete
Global transparency array
Region_composition_segment ()
        num_of_objects
        for (i=0; i<num_of_objects; i++){
                object_id
                object_horizontal_position
                object_vertical_position
        }
}

Text_segment (){
        for (i=0; i<num_of_TEXT_objects; i++){
                object_id
                num_of_charactor codes
                for (j=0; j<num_of_character codes; j++){
                    charactor code
                }
        }
}

BMP_segment (){
        for (i=0; i<num_of_BMP_objects; i++){
                object_id
                BMP
        }
}

Display_control_sequences_segment (){
        for (i=0; i<num_of_display_sequences; i++){
                Display_sequence (){
                        object_id
                        Cut in time & Cut out time of the dislay control sequence
                        MNG chunck like information
                }
        }
}
```

RECORDING MEDIUM HAVING A DATA STRUCTURE FOR MANAGING REPRODUCTION OF TEXT SUBTITLE DATA AND METHODS AND APPARATUSES OF RECORDING AND REPRODUCING

CROSS REFERENCE TO RELATED APPLICATIONS

This application is a continuation of application Ser. No. 10/820,009 filed Apr. 8, 2004 now U.S. Pat. No. 7,787,753, which claims priority under 35 U.S.C. §119 on Korean Application No. 10-2003-022390 filed Apr. 9, 2003; the contents of which are incorporated by reference in their entirety.

BACKGROUND OF THE INVENTION

1. Field of the Invention

The present invention relates to a recording medium having a data structure for managing reproduction of text subtitle data and methods and apparatuses of recording and reproducing.

2. Description of the Related Art

Optical disks capable of storing large amounts of high-quality digital video/audio data, for example, DVDs (digital versatile disks), and DVD recording/reproducing apparatuses are now commercially available.

Text subtitle data, such as caption data to be superimposed on main video data is recorded on a DVD as image data (e.g., BMP data). An optical disk reproducing apparatus reproduces the subtitle image data along with the main video data from the DVD and displays the main data and text subtitle data on an external display apparatus connected to the optical disk reproducing apparatus.

A user of such an optical disk reproducing apparatus, therefore, can view the main video data of a DVD overlaid with related subtitle text data using a display apparatus.

Recently, the standardization of new high-density optical disks having higher recording density than a DVD has been progressing rapidly. The Blu-ray Disc ROM (BD-ROM) is one example of these new optical disks. In addition, methods for managing text subtitle data, which are capable of displaying the main video data of a BD-ROM with superimposed captions by recording image data of subtitles on the BD-ROM (e.g., BMP data), and control information, for display control of the image data on the BD-ROM, have been proposed.

In the case where the text subtitle data is recorded as image data such as BMP data, the character attributes of the recorded text subtitle data (e.g., the character font and the character size) cannot be changed or a large amount of image data for displaying the subtitle in various ways is additionally required. A method of effectively managing text subtitle data for a high-density recording medium such as an optical disk is not yet available.

SUMMARY OF THE INVENTION

The recording medium according to the present invention includes a data structure for managing reproduction of text subtitle data.

In one embodiment, the recording medium includes a subtitle area storing a text subtitle stream. The text subtitle stream includes text subtitle data and at least one of global style information and local style information. The global style information provides at least one of composition information and rendering information, and the local style information provides font information for at least a portion of the text subtitle data.

For example, in one embodiment, the composition information includes position information for positioning a text subtitle represented by the text subtitle data on a display.

As another example, in one embodiment, the rendering information includes a display effect of the text subtitle data.

As an example of the font information, one embodiment discloses the font information of font, font size and a font style.

The present invention further provides apparatuses and methods for recording and reproducing the data structure according to the present invention, and recording and reproducing data streams according to the present invention.

BRIEF DESCRIPTION OF THE DRAWINGS

The accompanying drawings, which are included to provide a further understanding of the invention, illustrate example embodiments of the invention, and together with the description, serve to explain the principles of the present invention.

In the drawings:

FIG. 1 illustrates an example embodiment of a data structure recorded on a recording medium for managing reproduction of text subtitle data in accordance with the present invention;

DETAILED DESCRIPTION OF THE PREFERRED EMBODIMENTS

In order that the invention may be fully understood, exemplary embodiments thereof will now be described with reference to the accompanying drawings.

FIG. 1 illustrates an example embodiment of a data structure recorded on a recording medium for managing reproduction of text subtitle data. In this and the following examples, a BD-ROM will be cited as the high density recording medium; however, the present invention is not limited to this example. As shown in FIG. 1, a PES (packetized elementary stream) packet for a subtitle of a BD-ROM includes a text segment, a BMP segment, and a display control sequence segment.

The text segment includes the number of character codes, a unique object ID for each text object and a plurality of character codes for each character code number. The BMP segment includes BMP data and a unique object ID for each BMP object.

The display control sequence segment includes display control information for a number of display sequences. The display control information includes, for example, cut-in time and cut-out time of a subtitle, a unique object ID to which each display control sequence applies, etc.

The PES packet of the subtitle also includes, among other things not shown for the sake of brevity, a presentation time stamp (PTS), a flag (or an indicator) text_presence_flag indicating whether a text segment exists in the subtitle PES, a flag (or indicator) BMP_presence_flag indicating whether a BMP segment exists in the subtitle PES, the number of text objects included in the subtitle PES, and the number of BMP objects included in the subtitle PES.

The PES packet further includes a page composition segment providing composition and rending information for an entire page or display screen, a global palette providing color information, and a global transparency array providing transparency information. For the sake of brevity, these elements not directly related to subject matter of the present invention, will not be described in detail.

The PES packet additionally includes a region composition segment. For each object in a number of objects, the region composition segment provides a unique object ID, and horizontal and vertical positioning on a display of the object region identified by the object ID.

Figure 2:
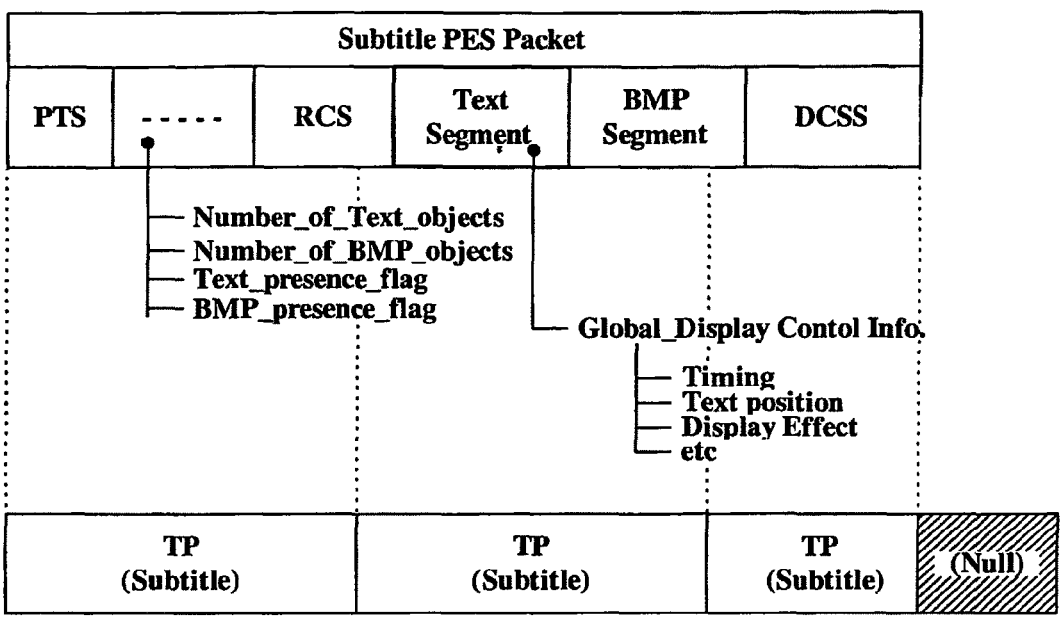
FIG. 2 illustrates one example embodiment of global display control information included in a data structure recorded on a recording medium for managing reproduction of text subtitle data.

FIG. 2 graphically illustrates the text subtitle PES packet of FIG. 1 and further shows global display control information included in this data structure. As shown, the PES packet is recorded on a BD-ROM as a plurality of transport packets, each having 188 bytes. Null data may be stuffed into a transport packet for making its size 188 bytes. The global display control information provides for display control of the character codes included in the text segment and includes timing information, composition information and rendering information. For example, the composition information may include text position information for positioning a text subtitle or caption represented by the text subtitle data (e.g., character codes) on a display. The rendering information may include display effect information, etc.

As shown in FIG. 2, the global display control information may be written in the text segment. For example, the global display control information may be included in the text data of the character codes or stored separately from the text data.

Figure 3:
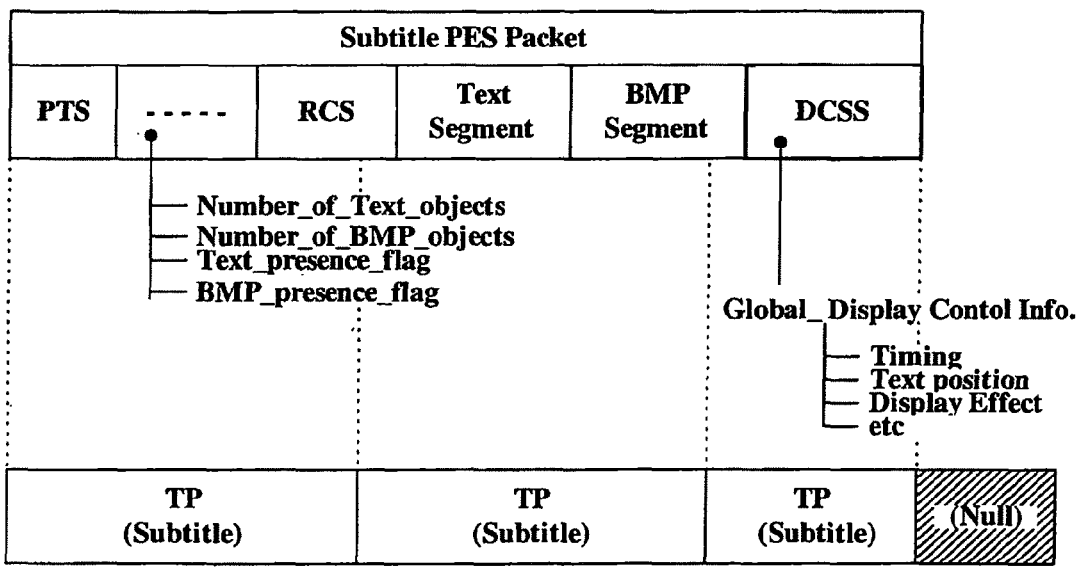
FIG. 3 illustrates another example embodiment of global display control information included in a data structure recorded on a recording medium for managing reproduction of text subtitle data.

Alternatively, the global display control information may be written in the display control sequence segment as shown in FIG. 3.

The data structure for managing the text subtitle may also include local display control information, which is different from the global display control information. Local control information provides font information for at least a portion of the text subtitle data (e.g., the character codes). The font information may include attributes of the character codes such as the text font, the text or font size, font style (e.g., italic, bold, underline, etc.), etc.

Figure 4:
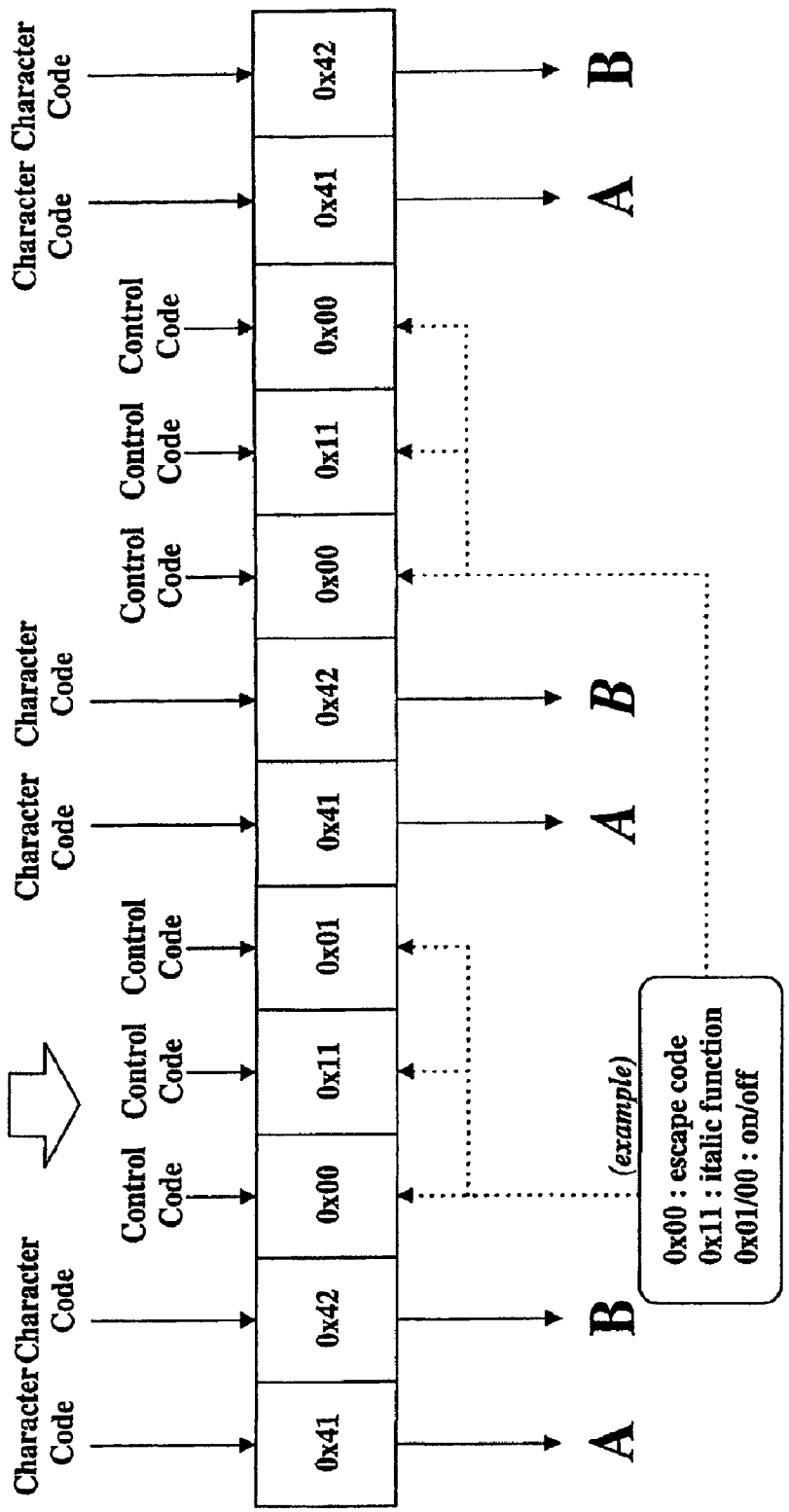
FIG. 4 illustrates an example embodiment of local display control information included in text segment of a subtitle in accordance with the present invention.

FIG. 4 illustrates an example of local display control information included in the text data of the character codes. The local control information provides font information for at least a portion of the text subtitle data (e.g., the character codes) sequentially recorded after the local control information. In this example, character codes '0x41' (A) and '0x42' (B) have control codes '0x00' (escape code), '0x11' (italic function), and '0x01' (italic on) recorded prior to and in association therewith such that these characters are displayed as italic characters 'A' and 'B'. Similarly, the same subsequent character codes have control codes '0x00' (escape code), '0x11' (italic function), and '0x00' (italic off) recorded prior to and in association therewith such that these characters are displayed as normal characters 'A' and 'B'.

Figure 5:
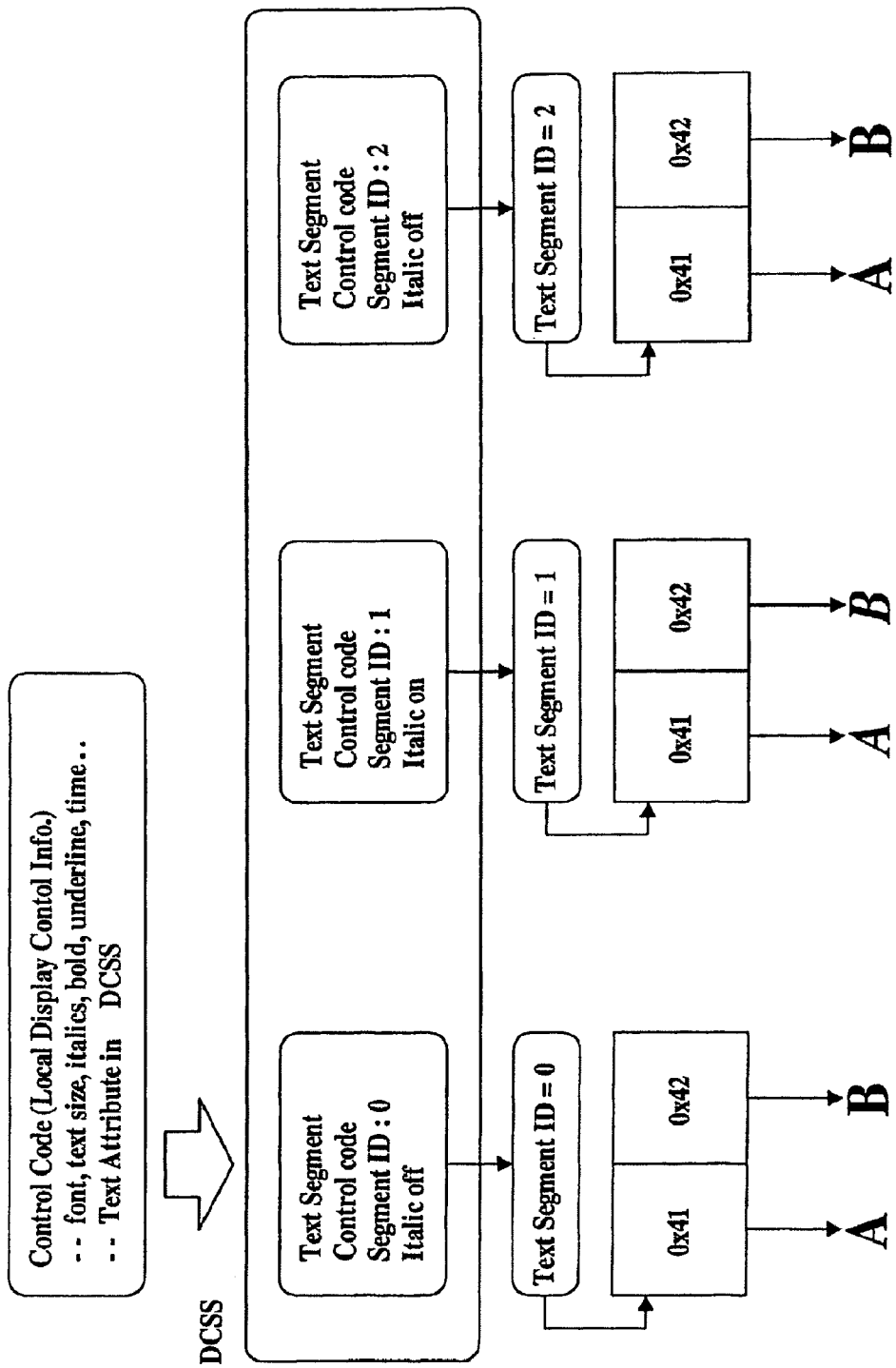
FIG. 5 illustrates an example embodiment of local display control information included in a display control sequence segment of a subtitle in accordance with the present invention.

FIG. 5 illustrates an example of local display control information included in the display control sequence segment. In this example, a second set of character codes '0x41' (A) and '0x42' (B) have a segment ID of '1', and the DCSS includes local display control information having a matching the segment ID (i.e., '1') and font information. Here, in this example, the font information is shown to be 'Italic on'. Accordingly, the characters 'A' and 'B' are displayed based on the local display control information having the matching segment ID. In this case, characters 'A' and 'B' are displayed as italics.

As another example, a third set of character codes '0x41' (A) and '0x42' (B) have the text segment ID '2'. The DCSS includes local display control information having the same '2' text segment ID. As shown in FIG. 5, the font information in this local display control information is 'Italic off'. As such, normal face characters 'A' and 'B' are displayed.

Figure 6:
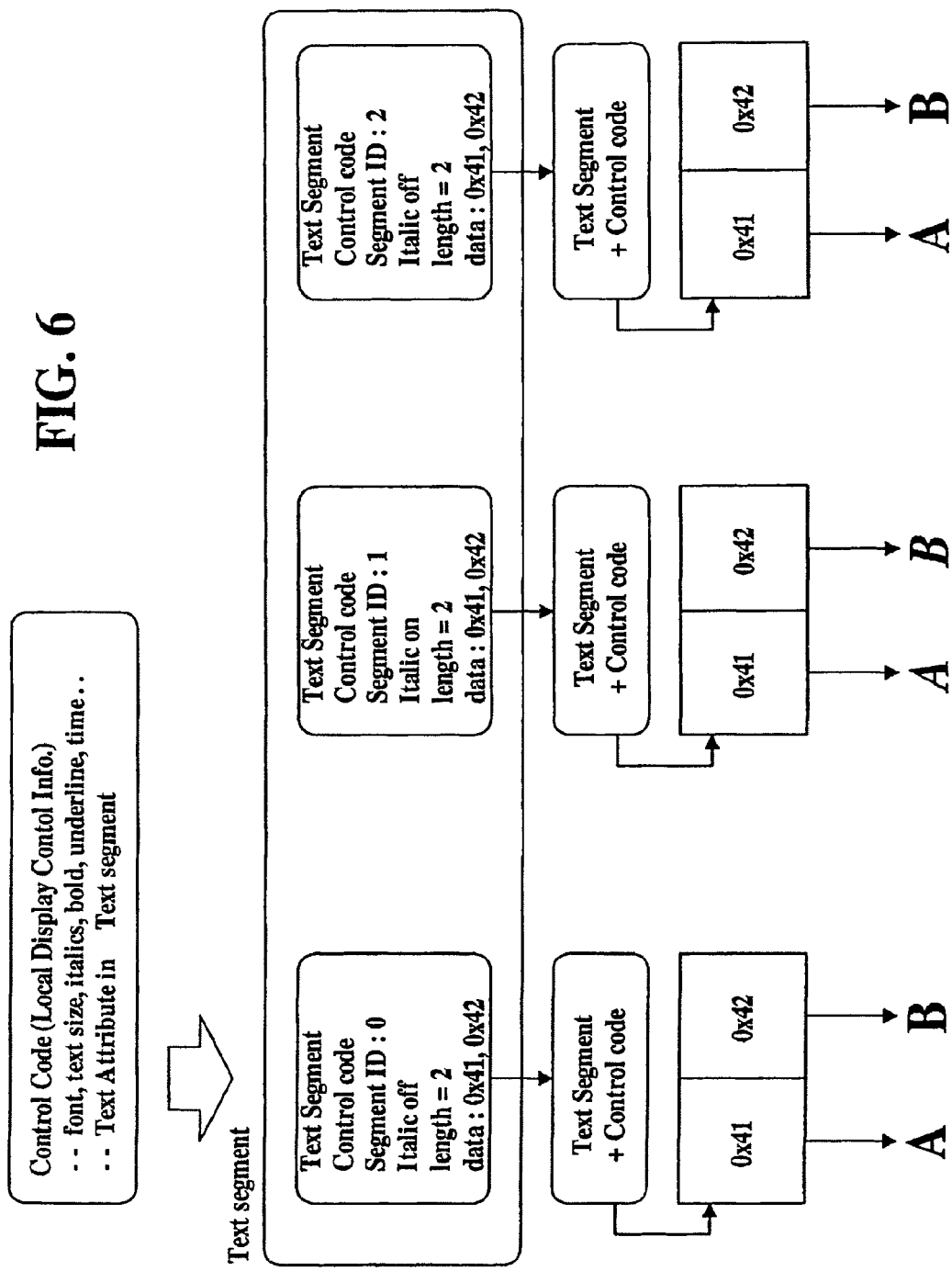
FIG. 6 illustrates another example embodiment of local display control information included in a text segment of an exemplary subtitle in accordance with the present invention.

FIG. 6 illustrates another example where local display control information is written in the text segment; however, in this embodiment, the local display control information is written separately from the text data of character codes. Here, the data structure of the local display control information is the same as that of FIG. 5, except that the local display control information further includes a length indicator. The length indicator indicates the number of characters in the associated portion of the text data (e.g., character codes) affected by the local display control information. In the example of FIG. 6, if the character codes '0x41' (A) and '0x42' (B) are preceded by the text segment ID '1' and the local display control information with the same text segment ID indicates 'italic on' and 'length=2', then the 'data: 0x41, 0x42', (i.e., characters 'A' and 'B') are displayed in italics.

On the other hand, as shown in FIG. 6, if the character codes '0x41' (A) and '0x42' (B) are preceded by the text segment ID and the local display control information with the same text segment ID indicates 'italic off' and 'length=2', then the 'data: 0x41, 0x42' with normal face characters 'A' and 'B' are displayed.

Figure 7:
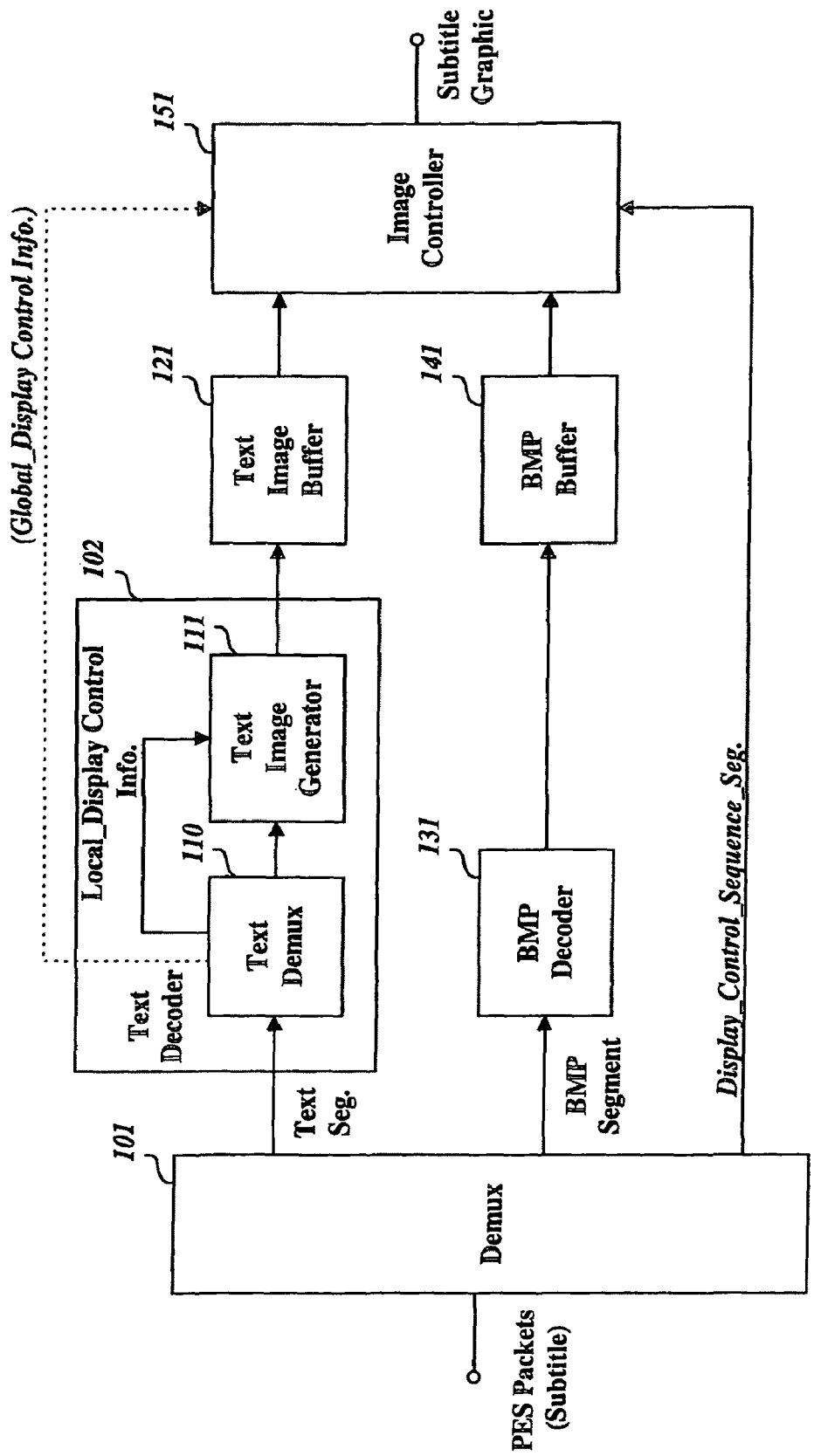
FIG. 7 illustrates a block diagram of a subtitle decoding system embodying the present invention.

FIG. 7 illustrates a block diagram of an exemplary optical disk reproducing apparatus in which the present invention may be advantageously embodied. As shown, the reproducing apparatus includes demux 101, a text decoder 102, a text image buffer 121, a BMP decoder 131, a BMP buffer 141, and an image controller 151.

The demux 101 receives data reproduced from the optical disk such as a BD-ROM by an optical pick-up (not shown) and demultiplexes the PES packet of a text subtitle into a text segment, a BMP segment, and a display control segment based on the sequence type information included in the PES packet (not shown) identifying the PES packet as a text subtitle PES.

The text decoder 102 comprises a text demux 110 and a text image generator 111. The text demux 110 demultiplexes the text segment from the demux 101 into text data of character codes and local display control information. The text image generator 111 converts the text data into text images based on the local display control information.

With reference to the local display control information such as the text font, the text size, italic, bold, and underline, the text image generator 111 decodes and converts the text data into corresponding text images, which are then temporarily stored in the text image buffer 12.

The BMP decoder 131 decodes the BMP data included in the BMP segment and outputs BMP images. The BMP buffer 141 stores the BMP images temporarily.

When the global display control information is stored with the text segment as shown in FIG. 2, the text demux 110 also demultiplexes this information from the text segment, and outputs (not shown) this information to the image controller 151. However, when the global display control information is stored with the display control sequence segment as shown in FIG. 3, the demux 101 demultiplexes the global display control information along with the display control segment, and output this information to the image controller 151 as shown in FIG. 7.

The image controller 151 reads the text images temporarily stored in the text buffer 121 and the BMP images temporarily stored in the BMP buffer 141, and controls the display of the text and BMP images based on the display control sequence segment received from the demux 101 and the global display control information received from the text demux 110 or the demux 101.

While not shown, the local display control information may include timing information, which is different from the timing information for controlling the display timing of the subtitle images. This local display control timing information is intended for controlling the color changing timing of characters included in the subtitle.

Figure 8:
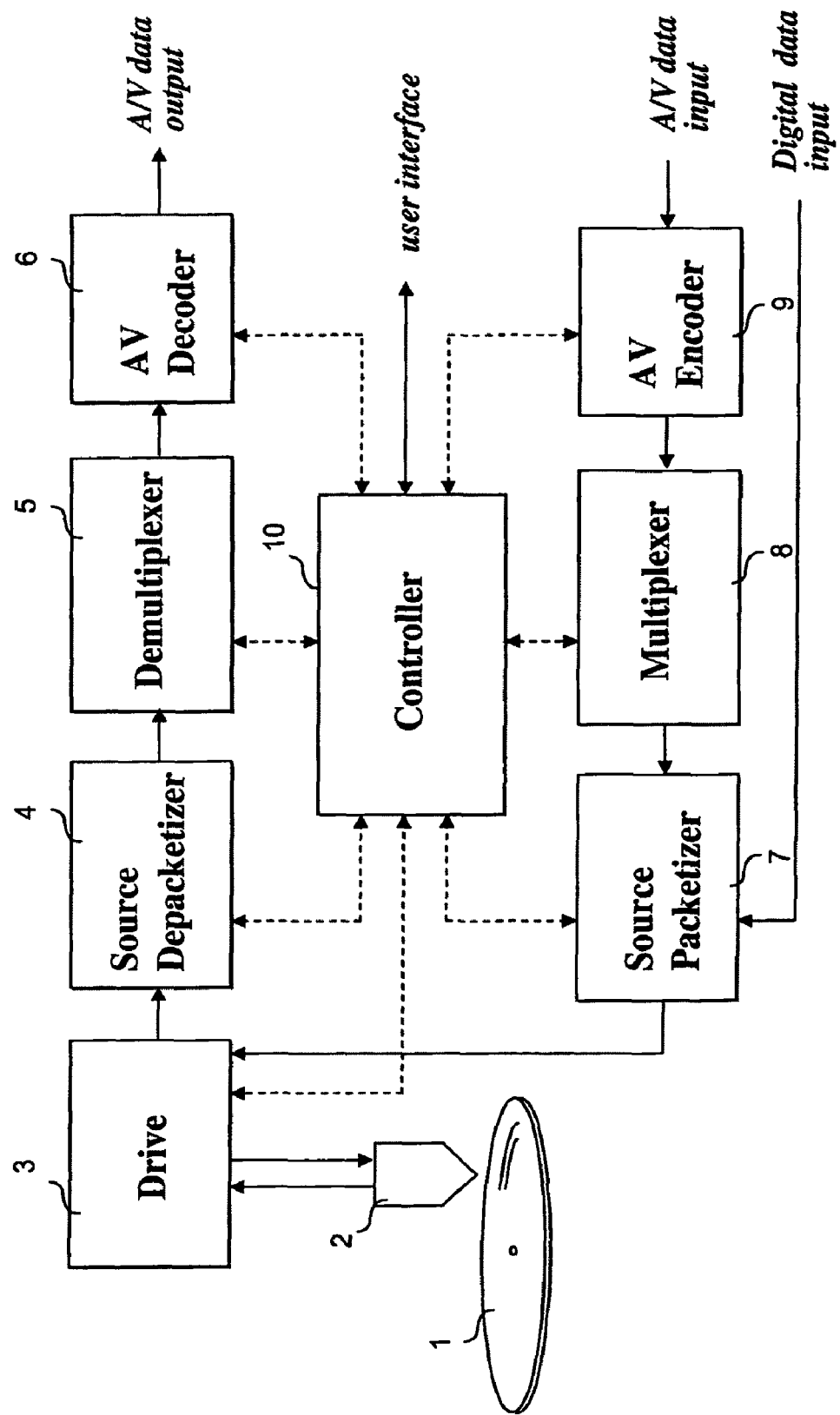
FIG. 8 illustrates an embodiment of a recording and reproducing apparatus according to the present invention.

FIG. 8 illustrates a schematic diagram of an embodiment of an optical disk recording and reproducing apparatus according to the present invention. As shown, an AV encoder 9 receives and encodes data (e.g., still image data, audio data, text subtitle data etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

For example, based on information received via the user interface (e.g., instruction set saved on disk, provided over an intranet or internet by a computer system, etc.) the controller 10 controls the drive 3 to record one or more of the data structures of FIGS. 1-6 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format. As will be appreciated, the logical blocks of this embodiment may be structured in accordance with the physical structure described in detail with respect to FIG. 7.

While FIG. 8 has been described as a recording and reproducing apparatus, it will be understood that only a recording or only a reproducing apparatus may be provided using those portions of FIG. 8 providing the recording or reproducing function.

The data structure for and method for managing text subtitle data on a high-density recording medium in accordance with embodiments of the present invention allows effective management of the reproduction of the text subtitle data. For example, reproducing a subtitle in accordance with the present invention allows subtitle data to be recorded as text data, the size of which will be less than image data, and the text data may be displayed as various subtitles based on the control information.

As apparent from the above description, the present invention provides methods and apparatuses for recording a data structure on a high density recording medium for managing reproduction of text subtitle data.

The above description further provides methods and apparatus for reproducing text subtitle data based on the data structure for managing the reproduction of the text subtitle data.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. An optical disc, comprising:
   an area storing a text subtitle stream including at least a first segment and a second segment, the first segment including first style information and the second segment including text subtitle data and second style information,
   wherein the second segment is linked to the first segment, the first style information includes at least one of composition information and rendering information for a region including the text subtitle data, and the second style information includes font information for the text subtitle data,
   wherein the font information is declared at a beginning of at least a portion of the text subtitle data affected by the font information,
   wherein the second segment includes a length indicator indicating a length of the at least the portion of the text subtitle data, and
   wherein each of the first segment and the second segment includes a segment identifier identifying the first segment and the second segment, respectively.

2. The optical disc of claim 1, wherein the composition information includes position information for positioning a text subtitle, represented by the text subtitle data, on a display.

3. The optical disc of claim 2, wherein the rendering information includes display effect information for the text subtitle data.

4. The optical disc of claim 1, wherein the font information includes at least one of a font, a font size and a font style.

5. The optical disc of claim 1, wherein the text subtitle data includes at least one text string.

6. The optical disc of claim 1,
wherein the text subtitle stream includes a plurality of second segments, and
wherein the first style information of the first segment includes style information associated with each of the plurality of second segments.

7. A method of recording data on an optical disc, the method comprising:
recording a text subtitle stream including at least a first segment and a second segment, the first segment including first style information and the second segment including text subtitle data and second style information,
wherein the second segment is linked to the first segment, the first style information includes at least one of composition information and rendering information for a region including the text subtitle data, and the second style information includes font information for the text subtitle data,
wherein the font information is declared at a beginning of at least a portion of the text subtitle data affected by the font information,
wherein the second segment includes a length indicator indicating a length of the at least the portion of the text subtitle data, and
wherein each of the first segment and the second segment includes a segment identifier identifying the first segment and the second segment, respectively.

8. The method of claim 7, wherein the composition information includes position information for positioning a text subtitle represented by the text subtitle data on a display.

9. The method of claim 8, wherein the rendering information includes display effect information for the text subtitle data.

10. The method of claim 7,
wherein the text subtitle stream includes a plurality of second segments, and
wherein the first style information of the first segment includes style information associated with each of the plurality of second segments.

11. An apparatus for recording data on an optical disc, the apparatus comprising:
a pickup unit configured to record data on the optical disc; and
a controller configured to control the pickup unit to record a text subtitle stream including at least a first segment and a second segment, the first segment including first style information and the second segment including text subtitle data and second style information,
wherein the second segment is linked to the first segment, the first style information includes at least one of composition information and rendering information for a region including the text subtitle data, and the second style information includes font information for the text subtitle data,
wherein the font information is declared at a beginning of at least a portion of the text subtitle data being affected by the font information,
wherein the second segment includes a length indicator indicating a length of the at least the portion of the text subtitle data, and wherein each of the first segment and the second segment includes a segment identifier identifying the first segment and the second segment, respectively.

12. The apparatus of claim 11, wherein the composition information includes position information for positioning a text subtitle represented by the text subtitle data on a display.

13. The apparatus of claim 12, wherein the rendering information includes display effect information for the text subtitle data.

14. The apparatus of claim 11,
wherein the text subtitle stream includes a plurality of second segments, and
wherein the first style information of the first segment includes style information associated with each of the plurality of second segments.

15. A method of reproducing a text subtitle stream recorded on an optical disc, the method comprising:
reading a first segment included in the text subtitle stream, the first segment including first style information, the first style information including at least one of composition information and rendering information for a region including text subtitle data;
reading a second segment included in the text subtitle stream, the second segment including the text subtitle data and second style information,
wherein the second segment is linked to the first segment, the second style information includes font information for the text subtitle data,
wherein the font information is declared at a beginning of at least a portion of the text subtitle data being affected by the font information,
wherein the second segment includes a length indicator indicating a length of the at least the portion of the text subtitle data, and
wherein each of the first segment and the second segment includes a segment identifier identifying the first segment and the second segment, respectively; and
reproducing the text subtitle data using the first and second style information.

16. The method of claim 15, wherein the composition information includes position information for positioning a text subtitle represented by the text subtitle data on a display.

17. The method of claim 16, wherein the rendering information includes display effect information for the text subtitle data.

18. The method of claim 15,
wherein the text subtitle stream includes a plurality of second segments, and
wherein the first style information of the first segment includes style information associated with each of the plurality of second segments.

19. An apparatus for reproducing a text subtitle stream recorded on an optical disc, the apparatus comprising:
a pickup unit configured to reproduce data recorded on the optical disc; and
a controller operatively coupled to the pickup unit and configured to control a reproduction of the text subtitle stream,
wherein the controller is further configured to control the pickup unit to read a first segment included in the text subtitle stream, the first segment includes first style information, and the first style information includes at least one of composition information and rendering information for a region including text subtitle data,
wherein the controller is further configured to control the pickup unit to read a second segment included in the text subtitle stream, and the second segment includes the text subtitle data and second style information, wherein the second segment is linked to the first segment, and the second style information includes font information for the text subtitle data, wherein the font information is declared at a beginning of at least a portion of the text subtitle data being affected by the font information, wherein the second segment includes a length indicator indicating a length of the at least the portion of the text subtitle data, wherein the controller is further configured to reproduce the text subtitle data using the first and second style information, wherein each of the first segment and the second segment includes a segment identifier identifying the first segment and the second segment, respectively, and wherein the controller is further configured to reproduce the text subtitle data using the first and second style information.

20. The apparatus of claim 19, wherein the composition information includes position information for positioning a text subtitle represented by the text subtitle data on a display.

21. The apparatus of claim 20, wherein the rendering information includes display effect information for the text subtitle data.

22. The apparatus of claim 19, wherein the text subtitle stream includes a plurality of second segments, and wherein the first style information of the first segment includes style information associated with each of the plurality of second segments.

* * * * *